United States Patent [19]

Duplessis et al.

[11] 4,385,385
[45] May 24, 1983

[54] CIRCUIT FOR MONITORING A DIGITAL SIGNAL GENERATOR

[75] Inventors: Philippe Duplessis, Colombes; Denis Jouannet, Paris, both of France

[73] Assignee: Compagnie Industrie le des Telecommunications Cit-Alcatel, Paris, France

[21] Appl. No.: 221,471

[22] Filed: Dec. 30, 1980

[30] Foreign Application Priority Data

Jan. 9, 1980 [FR] France ............... 80 00388

[51] Int. Cl.³ ............................................. G06F 11/10
[52] U.S. Cl. .................................... 371/25; 364/719; 371/53
[58] Field of Search ............... 371/25, 53; 364/719; 179/90 R, 90 K, 90 BD, 84 VF; 331/48; 328/14

[56] References Cited

U.S. PATENT DOCUMENTS

| | | | |
|---|---|---|---|
| 3,582,633 | 6/1971 | Webb | 371/25 |
| 3,680,069 | 7/1972 | Newmann et al. | 371/25 |
| 3,905,030 | 9/1975 | Lavanant et al. | 340/347 DA |
| 3,924,181 | 12/1975 | Alderson | 371/25 |
| 3,988,670 | 10/1976 | Gariazzo | 371/25 |
| 3,999,049 | 12/1976 | Roche et al. | 364/719 |
| 4,108,359 | 8/1978 | Proto | 371/25 |

*Primary Examiner*—Charles E. Atkinson
*Attorney, Agent, or Firm*—Sughrue, Mion, Zinn, Macpeak and Seas

[57] ABSTRACT

A monitoring circuit for monitoring a digital signal generator which generates signals that are linear combinations of sinewave signals each of whose frequencies are defined by a coefficient K that is proportional to the corresponding frequency. The generator including means for storing the coefficients corresponding to all the signals to be emitted, the coefficients having an integer portion and a fraction portion whose number of digits defines the smallest possible coefficient value which corresponds to a signal of minimum frequency fm such that all signals emitted by the generator are at frequencies which are multiples of the frequency fm. The monitoring circuit includes a redundancy calculator circuit (EX, RR) connected to the output S of the generator (G), and comparator means (CC) comparing the redundancy calculated by the redundancy calculator circuit with a stored constant theoretical value.

5 Claims, 3 Drawing Figures

CIRCUIT FOR MONITORING A DIGITAL SIGNAL GENERATOR

The invention relates to a circuit for monitoring the operation of a digital signal generator, and in particular a generator of sinewave signals. The invention is applicable to the electronics and telecommunications industries, especially in time switched telephone exchanges.

Digital generators are mainly used for emitting signalling according to various multifrequency codes. In time switching, they make it possible to process these signals and to convey them on time multiplexed connections under the same conditions as for speech signals.

Under such conditions, a digital signal generator is capable both of emitting the different possible signals corresponding to each of the codes used, and also of emitting these signals in time division on a plurality of channels going to a plurality of destinations.

In known monitoring systems, monitoring is performed by extracting the signal from the destination channels, and by comparing the extracted signal with the intended signal. Monitoring is thus fairly complex since it is performed channel by channel and for each signal for each of the codes used.

Preferred embodiments of the invention provide a circuit capable of performing permanent monitoring of the output signal from the generator without separating the channels and without taking into account the intended signals.

The present invention provides a monitoring circuit for monitoring a digital signal generator of the type that generates signals which are linear combinations of sinewave signals each of whose frequencies are defined by a coefficient K which is proportional to the corresponding frequency, such generators comprising means for storing said coefficients corresponding to all the signals to be emitted, said coefficients being stored in the form of an integer portion and a fraction portion, the number of digits in the fraction portion defining the smallest possible coefficient value, said smallest coefficient value corresponding to a signal of minimum frequency fm such that all signals emitted by the generator are at frequencies which are multiples of the minimum frequency fm, wherein the monitoring circuit comprises a redundancy factor calculator circuit connected to the output of the generator, and comparator means comparing the redundancy factor calculated by the redundancy factor calculator circuit with a stored constant theoretical value.

The circuit in accordance with the invention provides overall monitoring by redundancy factor at predetermined intervals, and without the use of a phase reference.

Much more accurate monitoring may be performed starting from a known initial state. A redundancy factor calculating circuit operating in response to the output of the generator then makes it possible to compare the redundancy factor calculated by the circuit with a theoretical redundancy factor which has been precalculated, stored in a memory, and read out from the memory. The comparison operation is performed periodically at a period which is a sub-multiple of the base period of the generator. It is thus possible to perform monitoring to as close a degree of accuracy as desired.

BRIEF DESCRIPTION OF THE DRAWINGS

A preferred emnodiment of the invention is described by way of example with reference to the accompanying drawing in which.

DETAILED DESCRIPTION

Consider a multifrequency digital signal generator which emits linear combinations of sinewave signals. The frequencies of the sinewave signals are generally defined by a numerical coefficient. In many cases the coefficient K is proportional to the desired frequency f:

$$K = af, \text{ where } f = Kfo \text{ i.e. } fo = 1/a$$

In practice, K is a number that is stored in binary form with an integer portion of length n bits and a fraction portion of length p bits, having the form:

$$K = \sum_{i=0}^{n-1} k_i 2^i + \sum_{j=1}^{p} k_j 2^{-j}$$

where n+p is the capacity of a register or a memory word, and where K is the stored number. fo is a base frequency related to that of the time base which controls the generator. For example, if reference is made to the case of a typical generator described in the Applicants' U.S. Pat. No. 3,905,030 the signal is supplied by scanning a memory which contains a table of successive values of the function Y=sin x at constant intervals. In this case, fo may be taken to be equal to the frequency at which the table is read.

In practice, there therefore exists a minimum value of a coefficient K, which is determined by the number of bits in the fraction portion: $K_{min} = 2^{-p}$ K is always a multiple m of $K_{min}$.

In other words $f = mK_{min}fo$

From this it follows that all frequencies generated by the generator are multiples of the minimum frequency $f_m = 2^{-p}fo$.

The generator thus possesses a base period which is independent of the frequencies emitted at its output, and which only depends on the frequency fo and the resolution of the generator. In particular, when the generator is operating in time-sharing mode, the overall period of the output signal is the same as that of the samples supplied by one of the time slots.

The embodiment described here concerns a generator of the type indicated in the patent mentioned above, and used in a time sharing mode.

Figure 1:
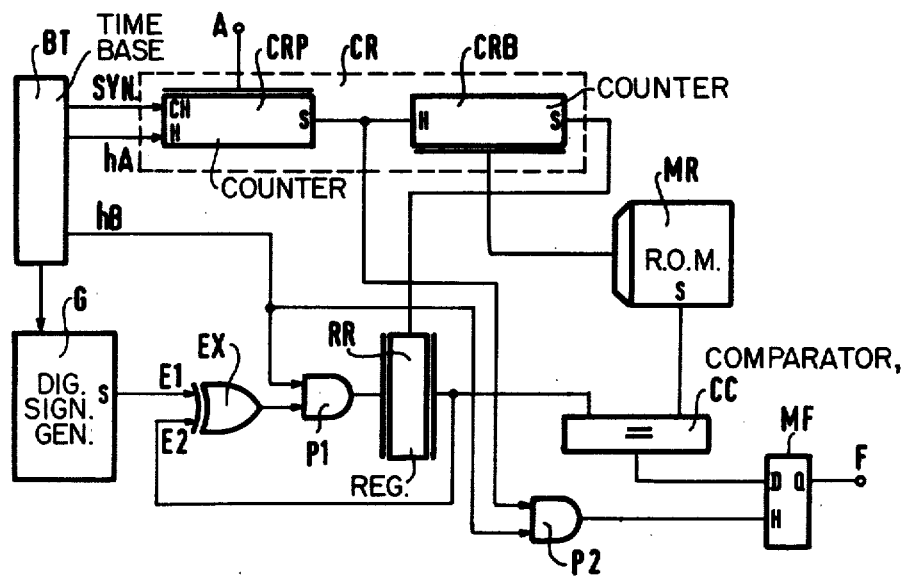
FIG. 1 is a block diagram of a periodic digital signal generator monitoring circuit in accordance with the invention.

As shown in FIG. 1, the generator G is driven by a time base BT and delivers q signals in series at its output S. Each signal sample is in the form, for example, of an 8-bit byte delivered in parallel. During one complete cycle, hereinafter referred to as a frame, the generator delivers q bytes. The samples are delivered at the output S at the rate of a clock signal $h_A$ from the time base. The clock signal $h_A$ drives a counter CR having a capacity CA equal to the ratio of the period T of the generator as defined above, divided by the period t of the signal $h_A$, i.e. CA=T/t.

In this application the data is monitored at the output of the generator by a redundancy factor calculator circuit operating on a block of b frames, i.e. b×q bytes.

The counter CR is constituted by two counters connected in series:

a step counter CRP having a capacity of q×b; and
a block counter CRB which counts blocks.

The theoretical redundancy factor of each block is stored in a read-only memory (ROM) MR which is addressed by the block counter CRB. The redundancy factor calculating circuit is constituted by a register RR storing the result of the present iteration of the calculation of the redundancy factor, and a group of exclusive OR-gates EX which receive samples from the output S of the generator on a first group of inputs $E_1$, and the result of the previous iteration of the calculation of the redundancy factor at the output of the register RR on a second group of inputs $E_2$.

The register RR is loaded from the outputs of the exclusive OR-gates EX under the control of a group of AND-gates P1 which are enabled by a signal $h_B$ from the time base. The signal $h_B$ has the same period as the clock signal $h_4$, but is shifted relative thereto to ensure stable operation.

The outputs of the register RR and of the memory MR are connected to a comparator CC which applies a mark to its output in the case of non-identity between the compared signals. The output from the comparator CC is connected to the data input of a D-type fault-marking flip-flop MF. The clock input to the flip-flop is controlled by an AND-gate P2 which receives the signal $h_B$ and the output signal from the step counter CRP.

A redundancy factor calculation and a redundancy factor comparison operation are thus performed on each block. The required synchronization between the counter CRP and the generator $G_1$ is provided by a signal SYN from the time base. This signal is received at the load enable input CH of the counter CRP to load a preset value A. Also, the register RR is reset to zero at the end of an output cycle from the counter CR.

The detailed operation of the circuit will be explained with reference to FIGS. 2 and 3.

The example given relates to a 128 time slot generator for use in a time division exhange using multiplexed PCM connections in accordance with the European standards, i.e. organised in frames of 32 8-bit time slots with a frame frequency of 8 kHz. The generator comprises a sine table having 1024 words that are 16 bits long (10 bits for the integer portion and 6 bits for the fraction portion). The table is scanned at the clock rate of 8 kHz.

Under these conditions, the base period T on the generator is equal to $1024 \times 2^6 \div 8000 = 8.192$ s.

During this period, the generator delivers a total of $128 \times 1024 \times 2^6 = 2^{23}$ bytes on the 128 time slots.

256 monitoring operations will be performed, for example, during this period. The capacity on the ROM is thus 256 bytes, and the block counter CRB is an 8-bit binary counter. Each monitoring operation thus concerns a block of $2^{15}$ bytes.

In practice, the counter CR is driven by a clock signal $h_1$ (FIG. 3) at the base frequency for European PCM operating at $32 \times 8 = 256$ signals per frame. The generator delivers one byte for every two steps of the clock $h_1$, and the counter CR has $2^{24}$ steps. The step counter CRP is constituted by two 8-bit counters (CRP1, CRP2) in series.

The set of gates $P_1$ is enabled by the clock signal $h_2$ and the 1-bits of the counter CRP1. The fault marking system provides for automatic reinitialisation of the generator under the following conditions:

the detection of a fault raises an alarm and resets the memories of the generator to zero; and the alarm is cancelled only after one complete period of the generator without a new fault being detected.

Figure 2:
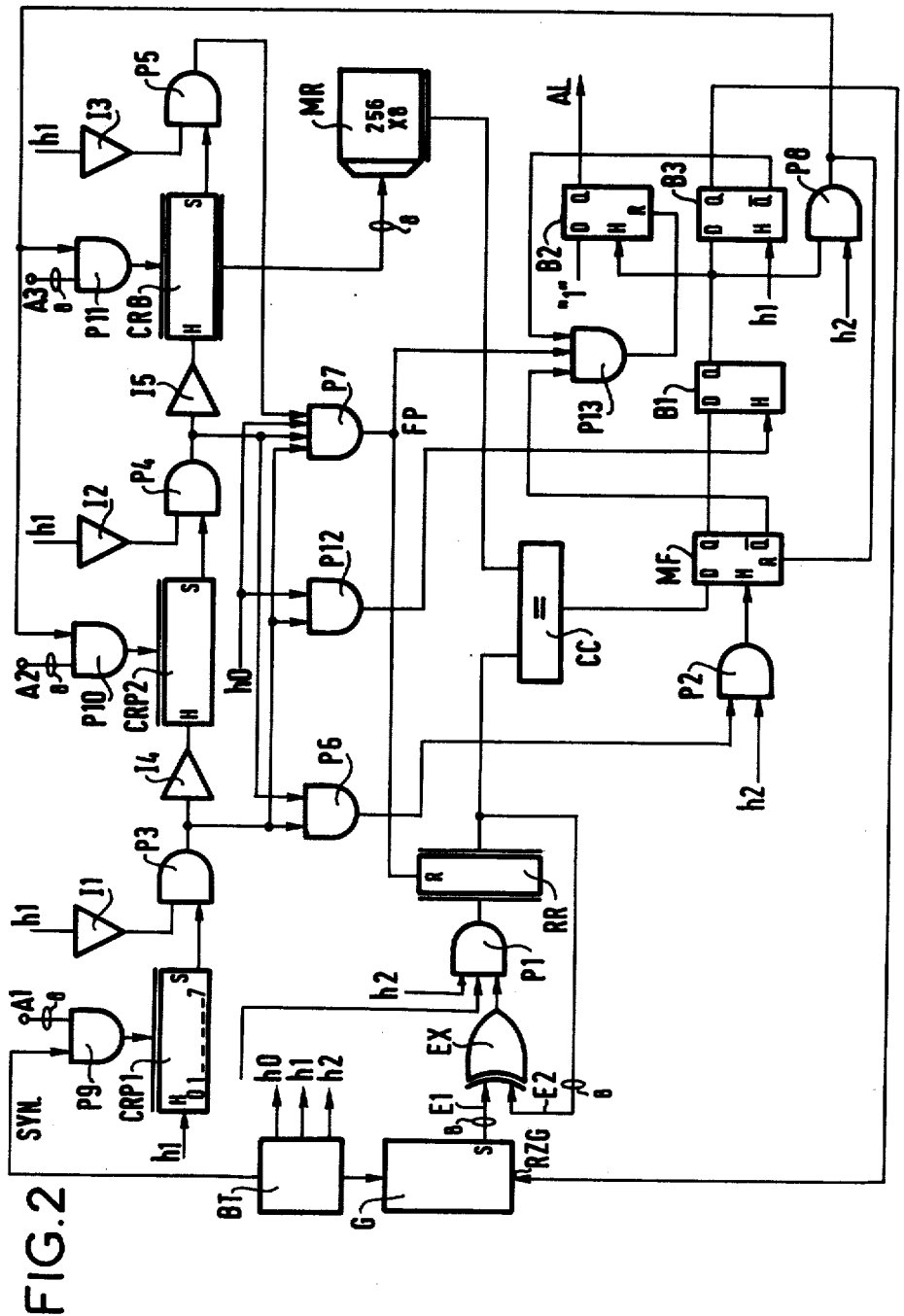
FIG. 2 is a more detailed circuit diagram of the circuit shown in FIG. 1.

The circuit comprises additional circuits shown in FIG. 2.

The outputs from the three counters CRP1, CRP2 and CRB are synchronised on the falling edge of the clock signal $h_1$ (by groups of AND-gates P3 to P5 and inverters $I_1$ to $I_5$). The end of block signal at the input to the gate P2 is provided by the gates P3 and P4 and by a gate P6. An end of period signal FP is provided by an AND-gate P7 which is controlled by the gates P3 to P5 and by the clock signal $h_0$. The end of period signal FP resets the register RR to zero. The clock signals $h_0$, $h_1$, and $h_2$ have the same period and are shifted relative to each other by one-third of a time slot period.

The fault marking circuit MF comprises four D-type flip-flops (MF, B1, B2 and B3). The Q-output of the flip-flops MF controls the D-input to the flip-flop $B_1$. The Q-output of the flip-flop B1 controls the D-input to the flip-flop B3 and the clock input to the flip-flop B2. The D-input to the flip-flop B2 is held in the 1 state. The circuits also comprise:

an alarm signalling connection AL at the output of the flip-flop B2;

a generator initialising connection RZG at the output of the flip-flop B3;

a gate P9 which receives the set value A1 and the synchronizing signal SYN to load the counter CRP1 with the eight initialising bits;

a connection for loading the counters CRP2 and CRB under the control of the flip-flop B1 via an AND-gate P8 which is enabled by the clock signal $h_2$, and sets of gates P10 and P11 for loading preset values A2 and A3. The output of the gate P8 also controls the resetting to zero of the flip-flop MF;

the clock input to the flip-flop B1 is controlled by the output from the gate P3 via the gate P12 which is enabled by the clock signal $h_0$; and the clear input to the flip-flop B2 is controlled by the signal FP via an AND-gate P13 which is enabled by the inverted or $\overline{Q}$ outputs from the flip-flops MF and B3.

Figure 3:
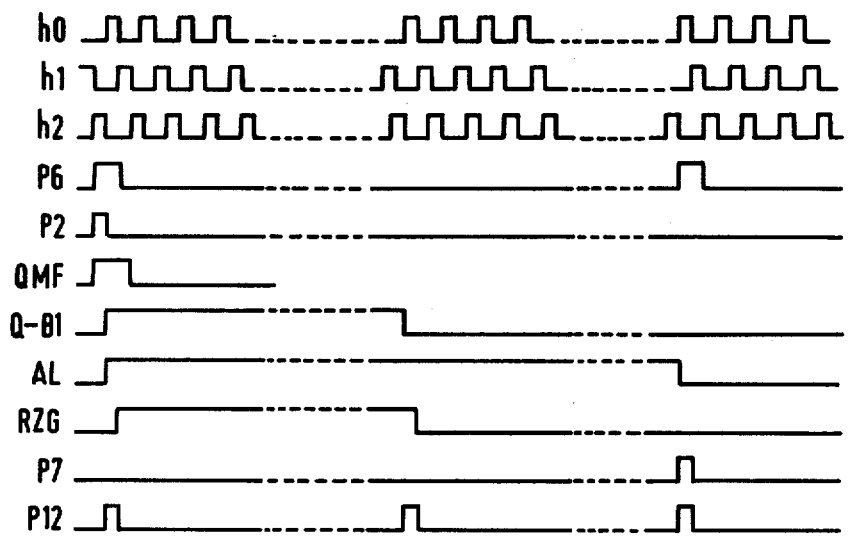
FIG. 3 is a timing diagram.

The timing diagram of FIG. 3 shows the changes of state of the Q outputs of the flip-flops (Q-MF, Q-B1 to Q-B3) in the event of a fault.

The signal on the connection RZG is maintained until the end of the frame following the detection of a fault, which makes it possible to restart the generator in phase with the signal SYN of the time base.

An important advantage of the circuit described lies in the fact that the generator is used in time sharing mode, and in that the intended signalling towards the various destination units has no effect on the monitoring, which monitoring takes place overall on the output signal upstream from the switching means for selecting the various destination units.

Naturally, the invention is not limited to the application described. Various of the means described could be replaced by equivalent means. In particular, the type of monitoring code used and the fault marking conditions and the automatic restart conditions may be modified to match the degree of monitoring required and the mode of operation of the generator. For example, monitoring could be performed only once per period, or only once per several generator periods.

We claim:

1. A monitoring circuit for monitoring a digital signal generator that provides an output of a stream of successive coefficient values representing a periodic signal, said monitoring circuit comprising:

a redundancy factor calculating circuit for calculating a redundancy factor for a block of a predetermined number of said coefficient values, said redundancy factor calculating circuit comprising an array of exclusive-OR gates, each of said exclusive-OR gates having a first input coupled to receive a respective output bit from said digital signal generator; and a register for storing outputs from said exclusive-OR gates, each of said exclusive-OR gates having a second input coupled to a respective output of said register;

a memory for storing precalculated redundancy factors for each said block;

a comparator for comparing a redundancy factor provided on said output of said redundancy factor calculating circuit with a corresponding precalculated redundancy factor read from said memory for generating an alarm if said redundancy factor provided on said output of said redundancy factor calculating circuit is different from said corresponding precalculated redundancy factor;

a common time base generator for producing synchronized clocking signals for operating said digital signal generator and clocking said register, wherein said register is clocked in synchronization with outputting of coefficients by said digital signal generator; and a counter for addressing said memory, said counter being clocked by a clock signal provided by said common time base generator, wherein said counter addresses said memory to read from said memory a precalculated redundancy factor for each said block.

2. The monitoring circuit of claim 1, wherein the capacity of said counter corresponds to a number of bytes of said coefficients outputted by said digital signal generator in a base period corresponding to a base frequency of a signal synthesized by said generator.

3. The monitoring circuit of claim 1, wherein said register is connected to be initialized in response to a predetermined output bit of said counter.

4. The monitoring circuit of claim 1, further comprising fault marker means for storing an output of said comparator.

5. The monitoring circuit of claim 4, further comprising circuit means operating in response to outputs from said common time base generator and said counter for cancelling a fault indication stored in said fault marker means after one complete period of operation of said counter if no further fault is detected.

* * * * *